United States Patent
Oyane et al.

(10) Patent No.: US 8,385,892 B2
(45) Date of Patent: Feb. 26, 2013

(54) RADIO BASE STATION AND COMMUNICATION CONTROL METHOD

(75) Inventors: Hidehiko Oyane, Yokohama (JP); Daisuke Tanigawa, Kawasaki (JP); Tatsuro Yajima, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 144 days.

(21) Appl. No.: 12/747,472

(22) PCT Filed: Dec. 10, 2008

(86) PCT No.: PCT/JP2008/072452
§ 371 (c)(1),
(2), (4) Date: Sep. 13, 2010

(87) PCT Pub. No.: WO2009/075302
PCT Pub. Date: Jun. 18, 2009

(65) Prior Publication Data
US 2011/0009100 A1  Jan. 13, 2011

(30) Foreign Application Priority Data
Dec. 10, 2007  (JP) .................................. 2007-318033

(51) Int. Cl.
*H04M 3/42* (2006.01)
(52) U.S. Cl. .................. 455/414.1; 455/450; 455/404.1; 455/435.3; 370/335
(58) Field of Classification Search ............... 455/452.2, 455/452.1, 453, 450, 434, 414.1, 435.2, 435.3, 455/512, 116.2, 404.1, 423, 445, 431, 458; 370/335, 259–271
See application file for complete search history.

(56) References Cited

U.S. PATENT DOCUMENTS

| | | | | |
|---|---|---|---|---|
| 2003/0026226 | A1* | 2/2003 | Miura | 370/335 |
| 2004/0176066 | A1* | 9/2004 | Binzel et al. | 455/404.1 |
| 2008/0043667 | A1* | 2/2008 | Chun | 370/328 |

FOREIGN PATENT DOCUMENTS

| | | |
|---|---|---|
| CN | 1748439 | 3/2006 |
| JP | 2001 359139 | 12/2001 |
| JP | 2003 32753 | 1/2003 |
| JP | 2003-87853 | 3/2003 |
| JP | 2006 86776 | 3/2006 |
| JP | 2006-513632 | 4/2006 |
| JP | 2007 13354 | 1/2007 |

OTHER PUBLICATIONS

Office Action issued Apr. 3, 2012, in Korean Patent Application No. 10-2010-7015205 (with English-language translation).

(Continued)

*Primary Examiner* — Chuong A Ngo
(74) *Attorney, Agent, or Firm* — Oblon, Spivak, McClelland, Maier & Neustadt, L.L.P.

(57) ABSTRACT

A radio base station 200 includes a call process controller 105 and a baseband processor 109. The call process controller 105 notifies the baseband processor 109 of an offset of the baseband resource when accepting the priority call. The baseband processor 109 changes the baseband resource to be allocated to the normal call in a predetermined cycle and applies a resource use restriction based on the offset notified from the call process controller 105, the resource use restriction restricting the baseband resource to be allocated to the normal call within a range defined by subtracting the offset from a total baseband resource.

7 Claims, 7 Drawing Sheets

OTHER PUBLICATIONS

Japanese Office Action issued May 29, 2012, in Japan patent Application No. 2007-318033 (with English translation).

Office Action issued Sep. 14, 2012, in Chinese Patent Application No. 200880119925.0 (with English-language Translation), 11 pages.

* cited by examiner

CALL PROCESS CONTROLLER 105

(b)

BASEBAND PROCESSER 109

RADIO BASE STATION AND COMMUNICATION CONTROL METHOD

TECHNICAL FIELD

The present invention relates to a radio base station and a communication control method, which are configured to handle a normal call for calling a communication destination and a priority call to be handled in preference to the normal call, and configured to change a baseband resource allocated to the normal call in a short cycle.

BACKGROUND ART

Traditionally, a radio communication system such as the third generation mobile phone system executes process of accepting a call for allowing a communication origin (such as a fixed phone terminal) to call a communication destination (such as a mobile phone terminal) and of allocating a resource necessary for communication between the communication origin and the communication destination according to the type of the accepted call.

To execute the above-described process, a radio base station generally includes a call process controller configured to execute call process, and a baseband processor configured to allocate a resource corresponding to the type of a call, or namely, a baseband resource (hereinafter abbreviated as a BB resource as appropriate) which represents a processing capability necessary for carrying out encoding/decoding, spreading/despreading, and the like (Patent Document 1, for example).

Such a radio base station is capable of executing processing of a priority call (for example, an emergency call in case of a disaster or the like) which is to be handled in preference to a normal call, that is, to which a BB resource is allocated in preference to the normal call.

Specifically, the call process controller of the radio base station periodically acquires information indicating a used BB resource and judges whether or not to accept the normal call based on the acquired information. To be more precise, if the used BB resource exceeds a predetermined threshold, the call process controller judges not to accept the normal call in order to secure a BB resource allocatable to a priority call.
Patent Document 1: Japanese Patent Application Publication No. 2006-86776 (Pages 3-4, FIG. 2)

DISCLOSURE OF THE INVENTION

Meanwhile, Enhanced UpLink (EUL) that enhances an uplink communication speed is defined in the third generation mobile phone system in recent years. According to the EUL, the radio base station changes a BB resource in an extremely short cycle (every 2 milliseconds), the BB resource being allocated to an accepted normal call (as well as a priority call), or more specifically, to communication started based on the call between the communication origin and the communication destination.

For this reason, there is a problem that it is not practical to cause the radio base station to judge whether or not to accept the normal call depending on a situation of the used BB resource in the short cycle in view of a processing capability of the call process controller. That is, when the EUL is introduced, there may be a case where the radio base station cannot allocate a BB resource necessary for a priority call.

The present invention has therefore been made in view of the aforementioned circumstances and an object thereof is to provide a radio base station and a communication control method capable of reliably allocating a baseband resource necessary for a priority call to which the baseband resource is to be allocated in preference to a normal call, even when a baseband resource to be allocated to the normal call is changed in an extremely short cycle.

To solve the above described problem, the present invention includes the following features. The first feature of the present invention is summarized in that a radio base station including a call process controller configured to accept a normal call to call a communication destination and a priority call to be handled in preference to the normal call; and a baseband processor configured to allocate a baseband resource to the normal call or the priority call based on the normal call or the priority call accepted by the call process controller, the baseband resource being a traffic processing capability in a baseband. The call process controller notifies the baseband processor of an offset of the baseband resource when accepting the priority call, and the baseband processor changes the baseband resource to be allocated to the normal call in a predetermined cycle and applies a resource use restriction based on the offset notified from the call process controller, the resource use restriction restricting the baseband resource to be allocated to the normal call within a range defined by subtracting the offset from a total baseband resource.

According to the radio base station described above, the baseband resource to be allocated to the normal call is restricted within a range defined by subtracting a predetermined offset from a total baseband resource. For this reason, even when the baseband resource allocated to the normal call is changed in an extremely short cycle in the EUL or the like, it is possible to allocate a baseband resource necessary for the priority call reliably.

The second feature of the present invention relates to the first feature of the present invention and is summarized in that the baseband processor allocates a priority call-baseband resource whose application to the normal call is not allowed by the resource use restriction, to the priority call.

The third feature of the present invention relates to the second feature of the present invention and is summarized in that when a free baseband resource unallocated to the normal call exists within a residual baseband resource obtained by subtracting the offset from the total baseband resource, the baseband processor allocates the free baseband resource to the priority call.

The fourth feature of the present invention relates to the first feature of the present invention and is summarized in that the baseband processor releases the resource use restriction when all the baseband resource allocated to the priority call is released in conjunction with termination of the priority call.

The fifth feature of the present invention is summarized in that a communication control method including the steps of accepting a normal call to call a communication destination and a priority call to be handled in preference to the normal call, allocating a baseband resource to any of the normal call and the priority call based on the normal call or the priority call accepted in the step of accepting the priority call, the baseband resource being a traffic processing capability in a baseband, and changing the baseband resource to be allocated to the normal call in a predetermined cycle. The method further comprising the steps of determining an offset of the baseband resource when the priority call is accepted, and applying a resource use restriction based on the determined offset to restrict the baseband resource to be allocated to the normal call within a range defined by subtracting the offset from a total baseband resource.

According to the present invention, it is possible to provide a radio base station and a communication control method capable of reliably allocating a baseband resource necessary for a priority call to which the baseband resource is to be allocated in preference to a normal call, even when a baseband resource to be allocated to the normal call is changed in an extremely short cycle.

BEST MODES FOR CARRYING OUT THE INVENTION

Next, an embodiment of the present invention will be described. Specifically, descriptions are given of (1) an overall schematic configuration of a radio communication system, (2) a functional block configuration of a radio base station, (3) operations of the radio base station, (4) operations and effects, and (5) other embodiments.

Note that, in the following description of the drawings, same or similar reference numerals denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

(1) Overall Schematic Configuration of Radio Communication System

Figure 1:
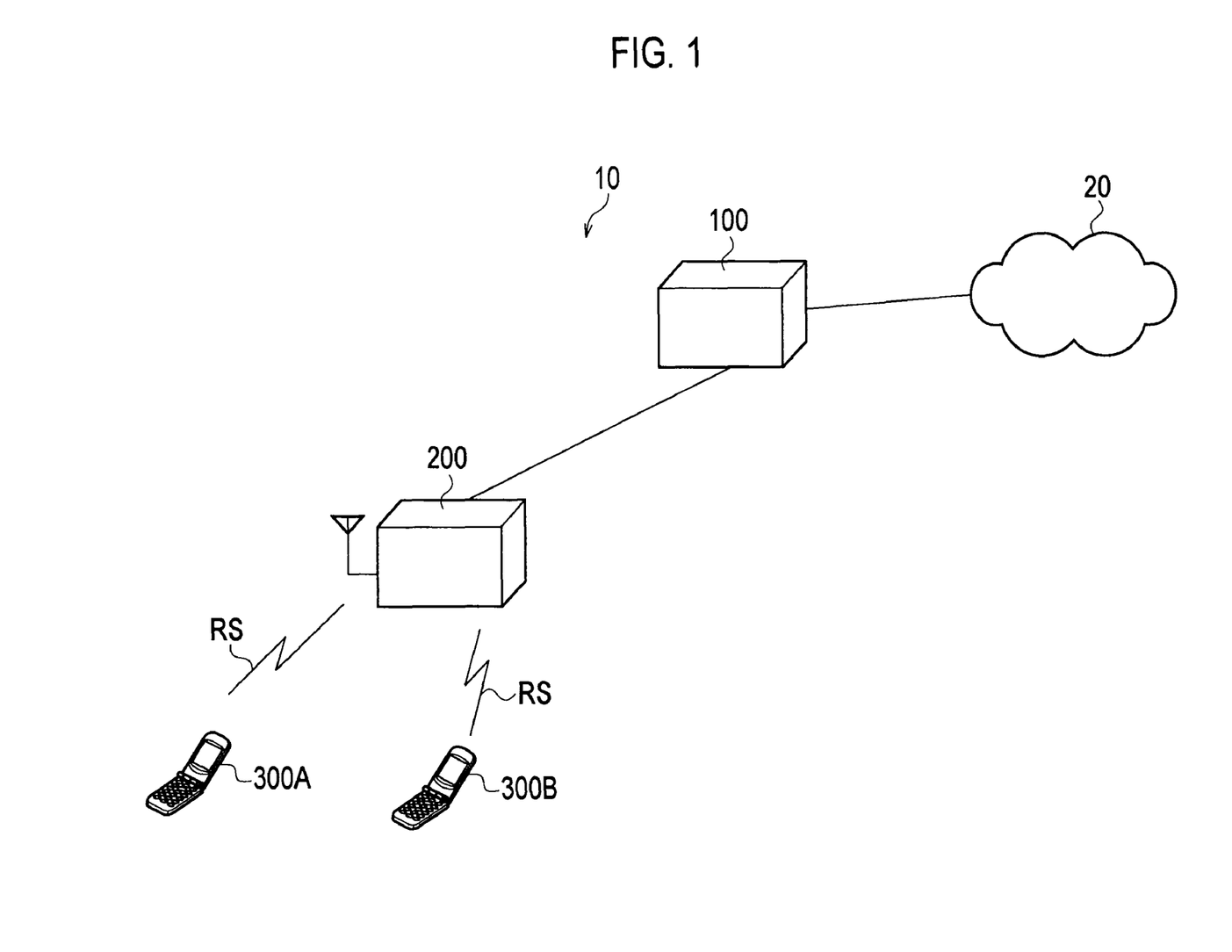
FIG. 1 is an overall schematic configuration diagram of a radio communication system 10 according to an embodiment of the present invention.

FIG. 1 is an overall schematic configuration diagram of a radio communication system 10 according to this embodiment. As shown in FIG. 1, the radio communication system 10 includes a radio network controller 100 (hereinafter an RNC 100), a radio base station 200, and mobile stations 300A and 300B. Note that the numbers of the radio base stations and the mobile stations included in the radio communication system 10 are not limited to the numbers shown in FIG. 1.

The RNC 100 is connected to a communication network 20. A communication device (a communication origin), for example, a fixed phone terminal (not shown), which executes communication with the mobile station 300A, is connected to the communication network 20.

The radio communication system 10 employs a radio communication scheme defined by the 3rd Generation Partnership Project (3GPP), or more specifically, the W-CDMA scheme. Moreover, the Enhanced UpLink (EUL) configured to improve data transmission rate in an uplink direction is introduced into the radio communication system 10.

The radio base station 200 transmits and receives radio signals RS to and from the mobile stations 300A and 300B. Meanwhile, the radio base station 200 is connected to the RNC 100. The radio base station 200 controls the radio signals RS and a baseband resource transmitted and received to and from the mobile stations 300A and 300B based on instructions from the RNC 100.

In particular, in this embodiment, the radio base station 200 can process a normal call to call a communication destination (for example, the mobile terminal 300A) and a priority call to be handled in preference to the normal call, i.e., two types of calls. Here, the priority call includes an emergency call to be permitted to the communication origin provided with a specific telephone number in case of a disaster or the like, for example.

(2) Functional Block Configuration of the Radio Base Station

Figure 2:
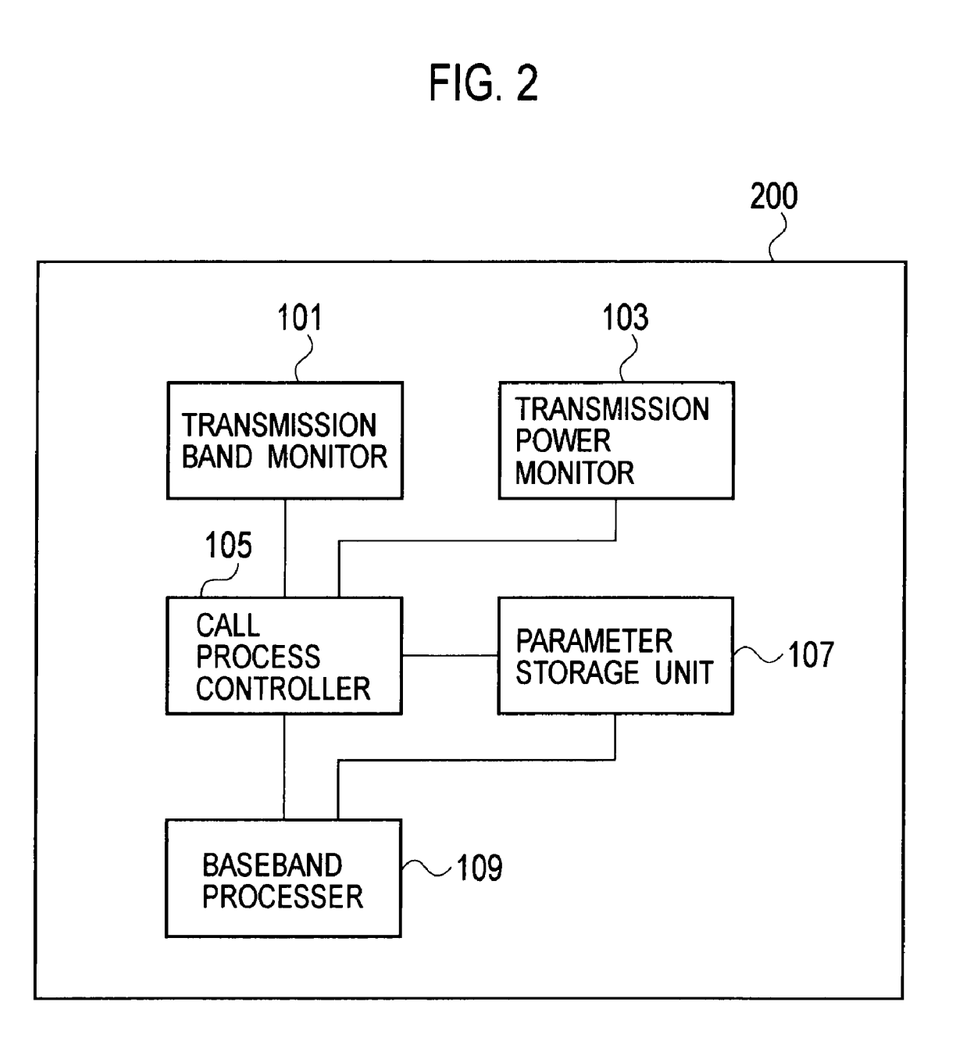
FIG. 2 is a functional block configuration diagram of a radio base station 200 according to the embodiment of the present invention.

FIG. 2 is a functional block configuration diagram of the radio base station 200. As shown in FIG. 2, the radio base station 200 includes a transmission band monitor 101, a transmission power monitor 103, a call process controller 105, a parameter storage unit 107, and a baseband processor 109. In the following, portions related to the present invention will mainly be described. Accordingly, it is to be noted that the radio base station 200 may include blocks (such as a power source unit) which are essential for implementing a function as the radio base station 200 but which are not illustrated or whose description is omitted therein.

The transmission band monitor 101 monitors a transmission band of the radio signals RS to be transmitted and received to and from the radio base station 200. Specifically, the transmission band monitor 101 monitors whether or not a transmission band necessary for communication to be started based on a call can be secured within an available transmission band in conjunction with acceptance of a normal call or a priority call.

The transmission power monitor 103 monitors transmission power of the radio signals RS to be transmitted by the radio base station 200. Specifically, the transmission power monitor 103 monitors whether or not transmission power necessary for the communication to be started based on the call can be outputted in conjunction with the acceptance of the normal call or the priority call.

The call process controller 105 accepts the normal call to call the communication destination (such as the mobile station 300A) and the priority call to be handled in preference to the normal call. Specifically, the call process controller 105 executes acceptance processing of the normal call and the priority call based on control data transmitted from the RNC 100.

Figure 5:
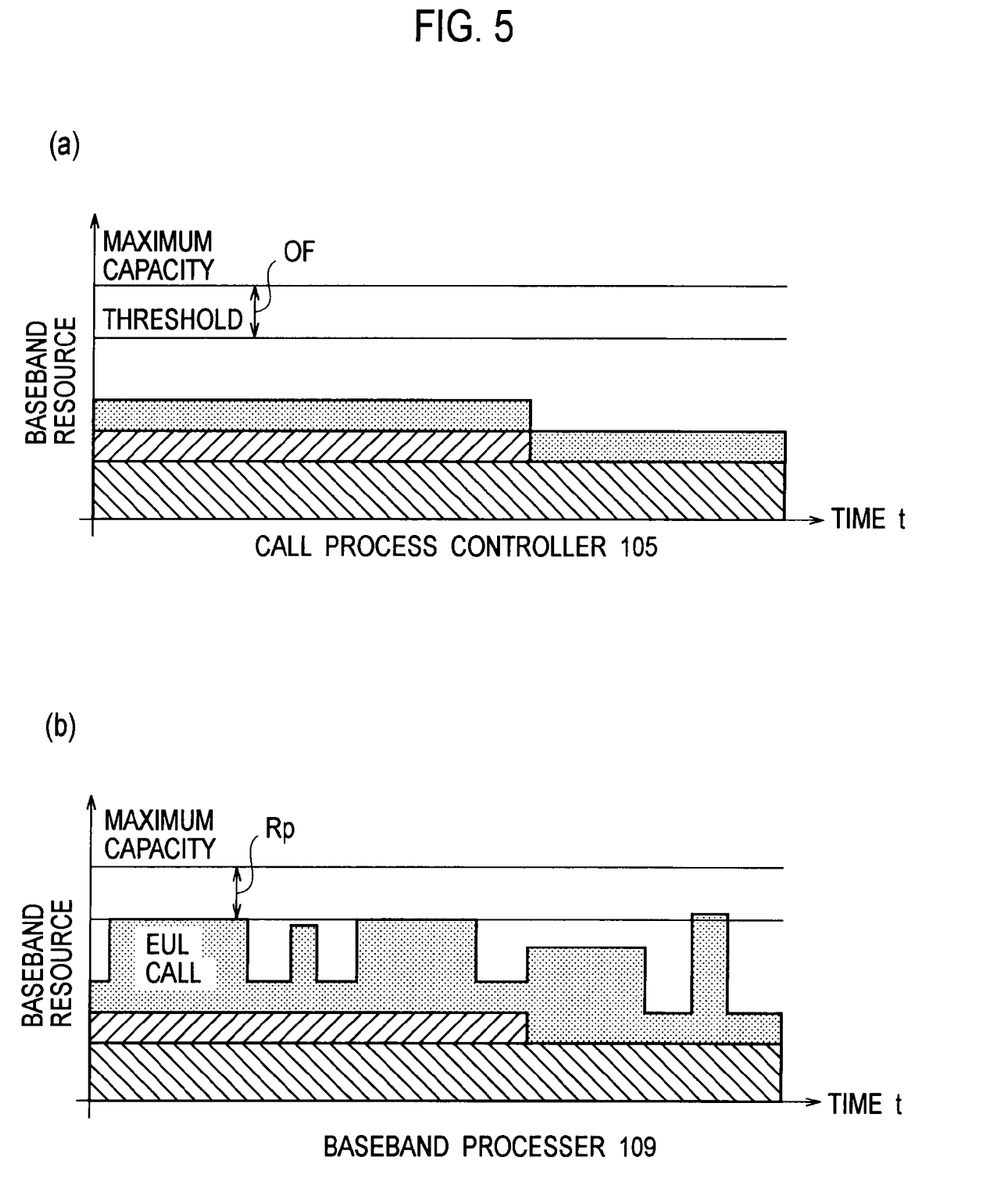
FIG. 5 is a view showing an example of allocation of the baseband resource R to the normal call and the priority call at a call process controller 105 and a baseband processor 109 according to the embodiment of the present invention.
Figure 6:
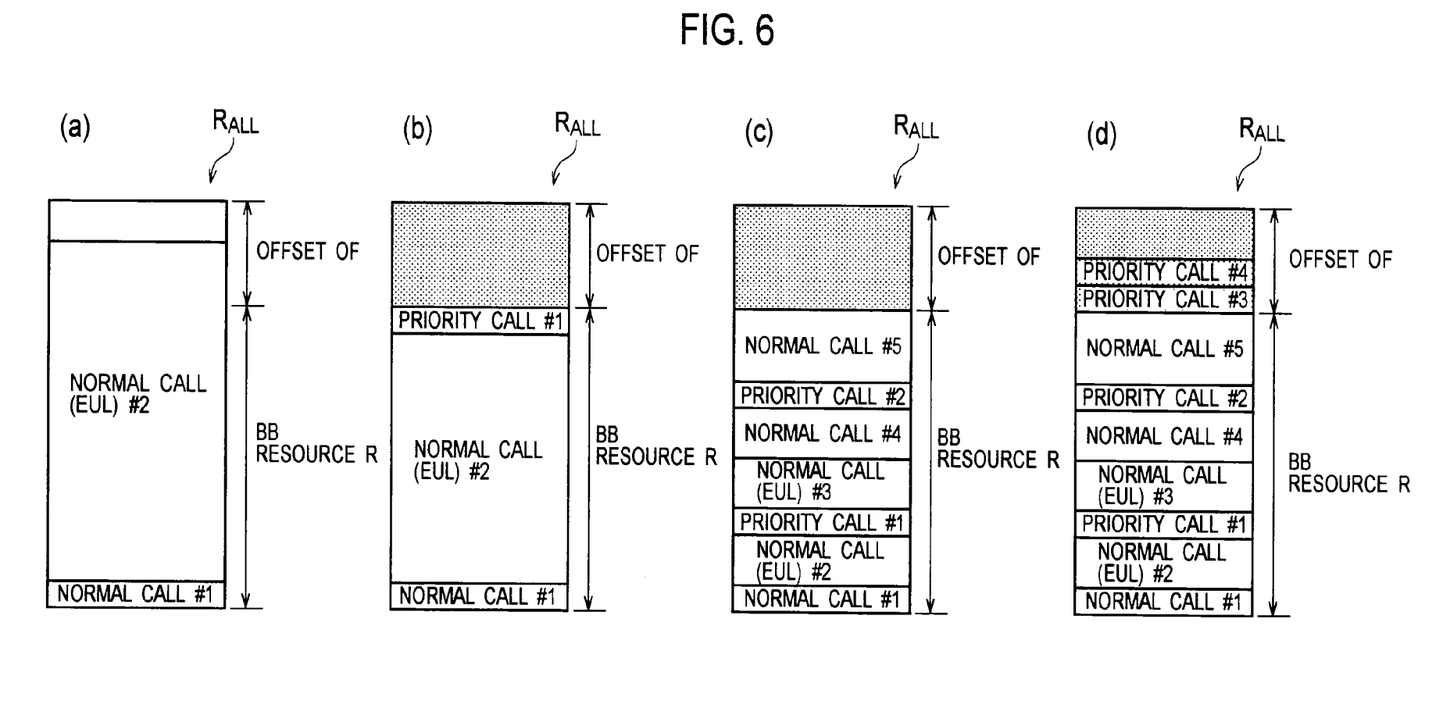
FIG. 6 is a view showing a concrete example of allocation of the baseband resource R to the normal call and the priority call at the call process controller 105 according to the embodiment of the present invention.
Figure 7:
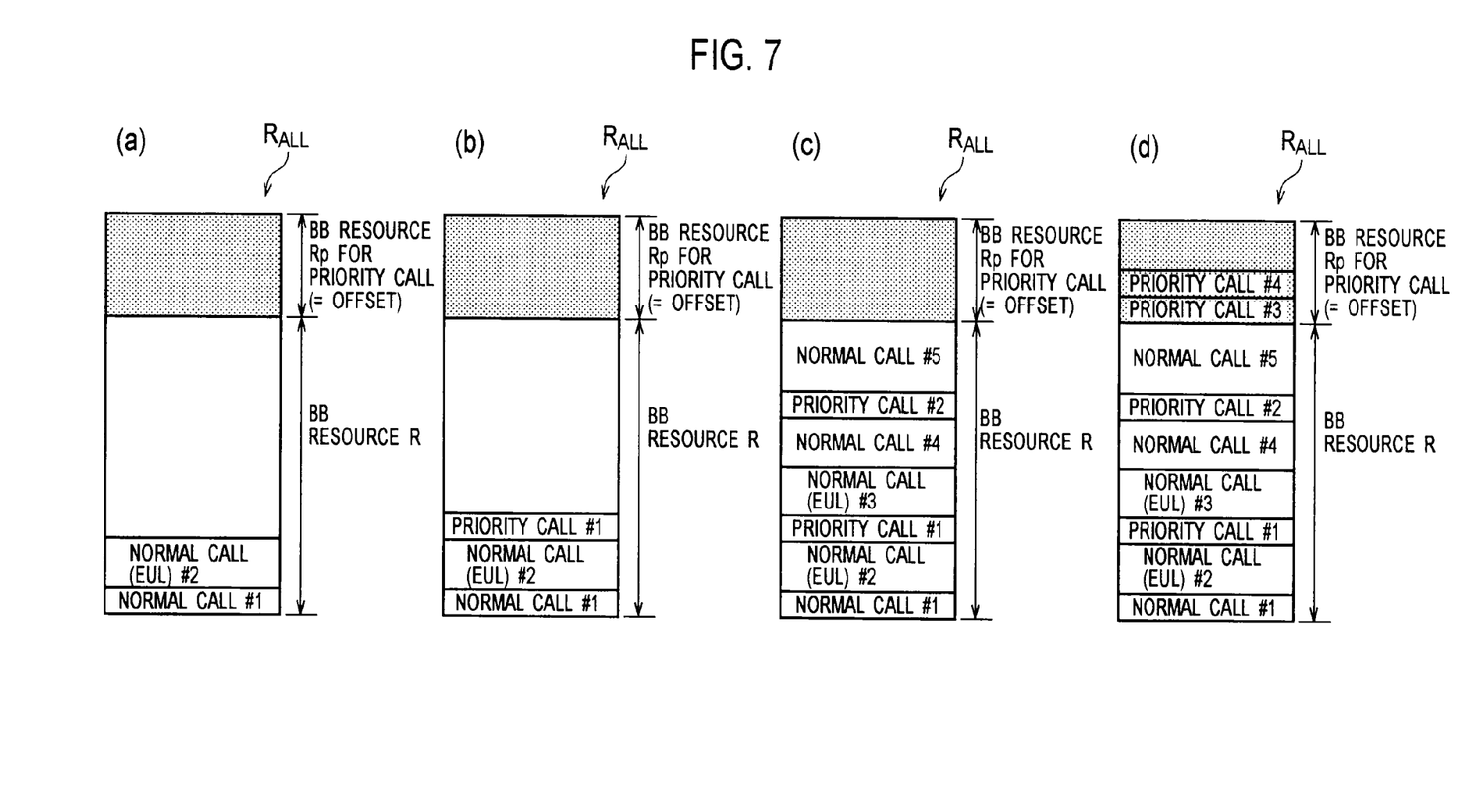
FIG. 7 is a view showing a concrete example of allocation of the baseband resource R to the normal call and the priority call at the baseband processor 109 according to the embodiment of the present invention.

Part (a) of FIG. 5 shows an example of allocation to a baseband resource R (not shown in FIG. 2, see Part (a) of FIG. 6, Part (a) of FIG. 7, etc.) of the normal call or the priority call by the call process controller 105. As shown in Part (a) of FIG. 5, the call process controller 105 judges whether or not to accept the normal call or the priority call based on a predetermined threshold of the baseband resource. In Part (a) of FIG. 5, each shaded block corresponds to a single normal call or a single priority call.

Upon acceptance of the normal call and the priority call, the call process controller 105 requests the baseband processor 109 for allocation of a necessary baseband resource R (hereinafter a BB resource R), i.e., allocation of a traffic processing capability in the baseband to the corresponding call.

In particular, in this embodiment, the call process controller 105 notifies the baseband processor 109 of offset OF (not shown in FIG. 2, see Part (a) of FIG. 5 and so forth) of the BB resource R upon acceptance of the priority call.

In addition, the call process controller 105 manages a state of allocation of the call to the BB resource R based on the normal call or the priority call which is accepted.

The parameter storage unit 107 stores parameters to be used by the call process controller 105 and the baseband processor 109. For example, the parameter storage unit 107 stores parameters concerning the transmission band usable and the transmission power outputtable by the radio base station 200, and the like.

Moreover, in this embodiment, the parameter storage unit 107 stores a value of the offset OF which is notified to the baseband processor 109 by the call process controller 105.

The baseband processor 109 executes a variety of processing in the baseband. Since the EUL is introduced into this embodiment, the baseband processor 109 changes the BB resource R in a predetermined cycle, or specifically, every Transmission Time Interval (TTI) equivalent to 2 milliseconds, the BB resource R being allocated to the normal call.

Part (b) of FIG. 5 shows an example of allocation of the normal call or the priority call to the baseband resource by the baseband processor 109. As shown in Part (b) of FIG. 5, the baseband processor 109 changes the BB resource R every TTI equivalent to 2 milliseconds according to a traffic amount (a data amount) supposed to be transmitted or on a state of the radio signal RS, the BB resource R being allocated to a normal call (an EUL call) operated in accordance with the EUL.

Here, as shown in Part (a) of FIG. 5, the call process controller 105 executes the acceptance processing of the normal call on the assumption that a BB resource R corresponding to the minimum transmission rate is allocated to the EUL call. In addition, the baseband processor 109 periodically reports the state of the BB resource R allocated to the normal call (including the EUL call) or the priority call, to the call process controller 105. When there is a difference between the state of the BB resource R managed by the call process controller 105 based on the normal call or the priority call which is accepted and the state of the BB resource R reported from the baseband processor 109, the call process controller 105 updates the state of the BB resource R managed by the call process controller 105 with the state of the BB resource R reported from the baseband processor 109.

The baseband processor 109 allocates a BB resource R to the normal call or the priority call based on the normal call or the priority call which is accepted by the call process controller 105.

The baseband processor 109 applies a resource use restriction which restricts the BB resource R to be allocated to the normal call within a range defined by subtracting the offset OF from a total baseband resource $R_{ALL}$ (not shown in FIG. 2, see Part (a) of FIG. 6 and Part (a) of FIG. 7), based on the offset OF notified from the call process controller 105. Note that the total baseband resource $R_{ALL}$ corresponds to the maximum capacity in Part (b) of FIG. 5.

When the resource use restriction is applied by the baseband processor 109, a priority call-baseband resource $R_P$ to be allocated to the priority call is secured as shown in Part (b) of FIG. 5. The baseband processor 109 can allocate a priority call-baseband resource $R_P$ whose application is to the normal call is not allowed by the resource use restriction, to the priority call.

Meanwhile, if a free baseband resource exists in the rest of the BB resource R (residual baseband resource) after subtracting the offset OF from the total baseband resource $R_{ALL}$, which is not allocated to the normal call, then the baseband processor 109 can also allocate the free baseband resource to the priority call.

When all the BB resource R allocated to the priority call is released in conjunction with termination of the priority call, or specifically, with termination of the communication started based on the priority call, the baseband processor 109 releases the applied resource use restriction.

(3) Operations of the Radio Base Station

Next, operations of the radio base station 200 will be described. Specifically, an operation to allocate the BB resource R to the normal call and the priority call, an operation to release the BB resource R allocated to the priority call, and examples of allocation of the BB resource R will be described.

(3.1) Allocation of the Baseband Resource

Figure 3:
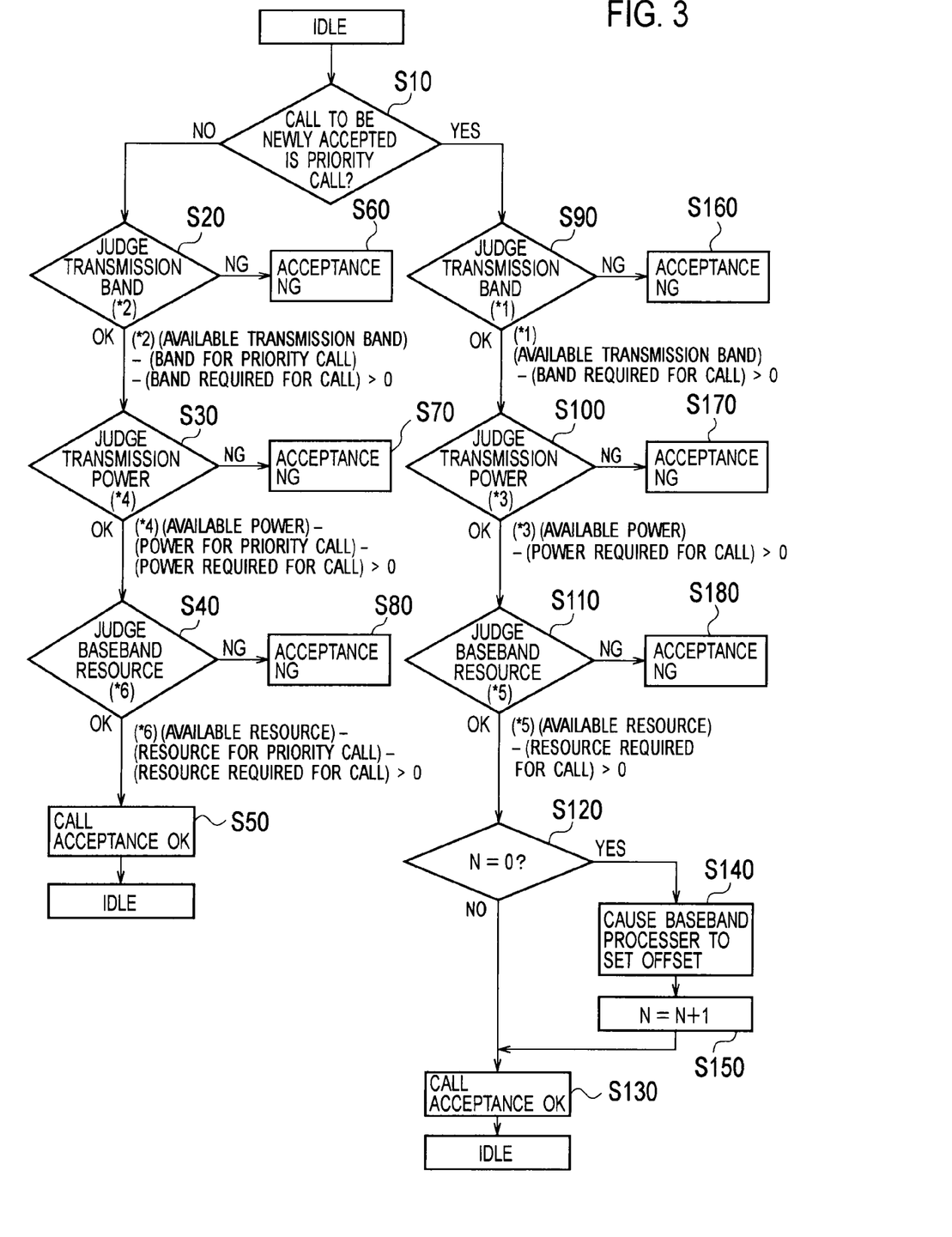
FIG. 3 is a view showing an operational flow of allocating a baseband resource R to a normal call and a priority call by the radio base station 200 according to the embodiment of the present invention.

FIG. 3 shows an operational flow of allocating the BB resource R to the normal call and the priority call by the radio base station 200.

As shown in FIG. 3, in step S10, the radio base station 200 judges whether or not a call to be newly accepted is the priority call.

When the call to be newly accepted is not the priority call, i.e., when the call is the normal call (No in step S10), the radio base station 200 executes judgment processing for the transmission band in step S20. Specifically, the radio base station 200 judges whether or not an available transmission band, from which a transmission band for the priority call and a transmission band of the call, i.e., the normal call to be accepted are subtracted, is greater than 0.

When the available transmission band is greater than 0 (OK in step S20), the radio base station 200 executes judgment processing for the transmission power in step S30. Specifically, the radio base station 200 judges whether or not available transmission power is greater than 0, the available transmission power being obtained by subtracting transmission power for the priority call and transmission power for the normal call to be accepted, from transmission power having been available before the subtraction.

When the available transmission power is greater than 0 (OK in step S30), the radio base station 200 executes judgment processing for the baseband resource in step S40. Specifically, the radio base station 200 judges whether or not the BB resource R, i.e., the free baseband resource is greater than 0, the BB resource R being obtained by subtracting the priority call-baseband resource $R_P$ to be allocated to the priority call and the BB resource R to be allocated to the normal call to be accepted, from an available BB resource R.

When the free baseband resource is greater than 0 (OK in step S40), the radio base station 200 judges that the radio base station 200 can accept the normal call, in step S50.

On the other hand, when the available transmission band is equal to or below 0 (NG in step S20), when the available transmission power is equal to or below 0 (NG in step S30), or when the free baseband resource is equal to 0 (NG in step S40), the radio base station 200 judges that the radio base station 200 cannot accept the normal call, in step S60, S70 or S80.

Meanwhile, when the call to be newly accepted is the priority call (Yes in step S10), the radio base station executes the judgment processing for the transmission band in step S90. Specifically, the radio base station 200 judges whether or not the available transmission band is greater than 0, the available transmission band obtained by subtracting the transmission band for the relevant call, i.e., the priority call to be accepted, from the available transmission band.

When the available transmission band is greater than 0 (OK in step S90), the radio base station 200 executes the judgment processing for the transmission power in step S100. Specifically, the radio base station 200 judges whether or not the available transmission power is greater than 0, the available transmission power being obtained by subtracting the transmission power for the priority call to be accepted, from the available transmission power.

When the available transmission power is greater than 0 (OK in step S100), the radio base station 200 executes the judgment processing for the baseband resource in step S110. Specifically, the radio base station 200 judges whether or not the BB resource R is greater than 0, the BB resource R being obtained by subtracting the BB resource R to be allocated to the priority call to be accepted, from the available BB resource R.

When the BB resource R is greater than 0 (OK in step S110), the radio base station 200 judges whether or not a value N is equal to 0 in step S120. The value N indicates the number of the accepted priority calls.

If N=0 does not hold true (NO in step S120), the radio base station 200 judges that the radio base station 200 can accept the priority call, in step S130.

When N=0 holds true (YES in step S120), the radio base station 200 determines the amount of the offset OF in step S140. Specifically, the baseband processor 109 of the radio base station 200 sets the offset OF based on the value of the offset OF stored in the parameter storage unit 107.

In step S150, the radio base station 200 updates the value N. Specifically, the radio base station 200 updates the value N in accordance with a mathematical formula N=N+1.

On the other hand, when the available transmission band is equal to or below 0 (NG in step S90), when the available transmission power is equal to or below 0 (NG in step S100), or when the BB resource R is equal to 0 (NG in step S110), the radio base station 200 judges that the radio base station 200 cannot accept the priority call, in step S160, S170 or S180.

(3.2) Release of the Baseband Resource

Figure 4:
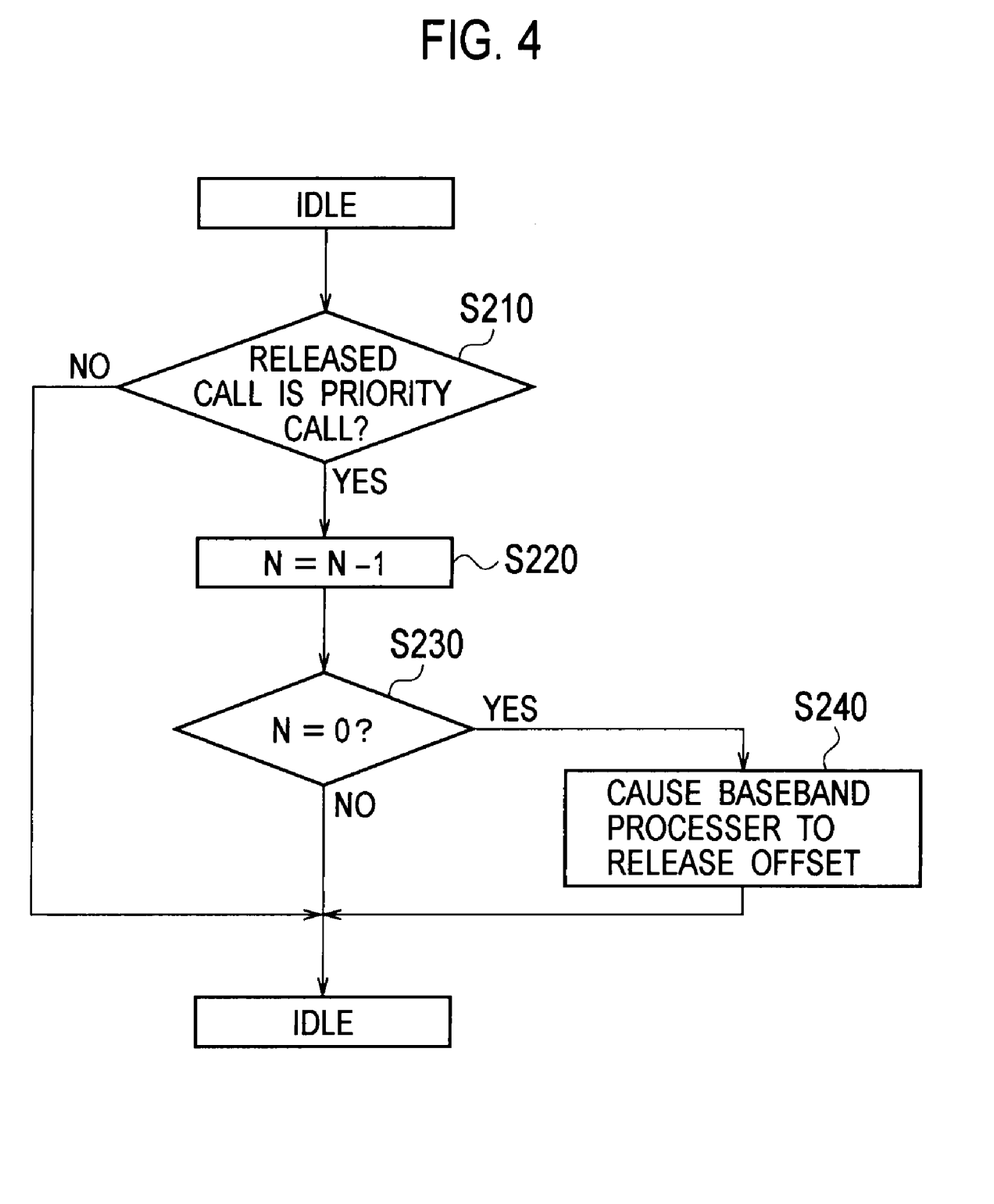
FIG. 4 is a view showing an operational flow of releasing the baseband resource R allocated to the priority call by the radio base station 200 according to the embodiment of the present invention.

FIG. 4 shows an operational flow of the radio base station 200 to release the BB resource R allocated to the priority call.

As shown in FIG. 4, in step s 210, the radio base station 200 judges whether or not a call to be released is the priority call.

When the call to be released is the priority call (Yes in step S210), the radio base station 200 updates the value N in step S220. Specifically, the radio base station 200 updates the value N in accordance with a mathematical formula N=N−1.

In step S230, the radio base station 200 judges whether or not the value N is equal to 0.

When N=0 holds true (Yes in step S230), in step S240, the radio base station releases the offset OF which has been set up.

(3.3) Examples of Allocation of the Baseband Resource

Parts (a) to (d) of FIG. 6 show a concrete example of allocation of the BB resource R to the normal calls and the priority calls at the call process controller 105. Parts (a) to (d) of FIG. 7(a) show a concrete example of allocation of the BB resource R to the normal call and the priority call at the baseband processor 109.

Parts (a) to (d) of FIG. 7 respectively correspond to Parts (a) to (d) of FIG. 6. For respectively, when allocation of the BB resource R to the normal call and the priority call is executed at the call process controller 105 as shown in Part (b) of FIG. 6, this represents that allocation to the normal call and the priority call is executed at the baseband processor 109 as shown in Part (b) of FIG. 7.

(3.3.1) When there is No Priority Call

As shown in Part (a) of FIG. 6, the call process controller 105 cannot know an amount of instantaneous variation of the BB resource R consumed by the normal call (the EUL call) and is therefore configured to allocate the BB resource R necessary for providing the minimum transmission rate. Here, since the offset OF is not set up with the baseband processor 109 at this stage, all the free baseband resource (hereinafter free BB resource) out of the total baseband resource $R_{ALL}$ (hereinafter the total BB resource $R_{ALL}$) is allocated to the normal call as shown in Part (a) of FIG. 7. That is, high-speed data transmission is available in the communication corresponding to the normal call.

(3.3.2) When the Priority Call Occurs

As shown in Part (b) of FIG. 6, when there is the offset OF, i.e., when there is the free BB resource other than the priority call-baseband resource $R_P$ (hereinafter the priority call BB resource $R_P$), the call process controller 105 allocates the priority call to a free BB resource as well.

Meanwhile, as shown in Part (b) of FIG. 7, the baseband processor 109 secures the priority call BB resource $R_P$ in accordance with the offset OF notified from the call process controller 105. The normal call is changed every TTI in the BB resource R excluding the priority call BB resource $R_P$.

(3.3.3) When Multiple Normal Calls and Priority Calls Continuously Occur

As shown in Part (c) of FIG. 6, the call process controller 105 allocates the BB resource R to the normal calls (normal calls #1 to 5) and the priority calls (priority calls #1 and 2) until the free BB resource except the priority call BB resource $R_P$ is exhausted.

Meanwhile, as shown in Part (c) of FIG. 7, the baseband processor 109 allocates the BB resource R excluding the priority call BB resource $R_P$ to the normal calls (normal calls #1 to 5) and the priority calls (priority calls #1 and 2). The baseband processor 109 allocates the free baseband resource to a new normal call or a new priority call until the BB resource R consumed by the normal calls, or namely, by the EUL calls fall to the minimum transmission rate.

(3.3.4) When there is No Free Bb Resource Other than the Priority Call BB Resource $R_P$ As shown in Part (d) of FIG. 6, the call process controller 105 allocates a region in the offset OF to the priority calls (priority calls #3 and 4). Meanwhile, the call process controller 105 suspends acceptance of the normal calls.

As shown in Part (d) of FIG. 7, the baseband processor 109 allocates regions of the priority call BB resource $R_P$ to the priority calls (the priority calls #3 and 4).

(4) Operations and Effects

According to the radio base station 200, the BB resource R to be allocated to the normal call is restricted within the range defined by subtracting the predetermined offset OF from the total baseband resource $R_{ALL}$. For this reason, even when the BB resource R to be allocated to the normal call in accordance with the EUL is changed in the extremely short cycle (2 milliseconds), it is possible to reliably allocate the BB resource R which necessary for the priority call.

Moreover, in this embodiment, the baseband processor 109 allocates the BB resource R to the normal call and the priority call based on the offset OF notified from the call process controller 105. For this reason, the call process controller 105 does not have to execute the processing while considering a variation in the BB resource R to be allocated to the normal call in accordance with the EUL. That is to say, a processing load on the call process controller 105 can be reduced.

In this embodiment, when the free baseband resource not allocated to the normal call exists in the BB resource R (the residual baseband resource), the baseband processor 109 allocates the free baseband resource to the priority call. In addition, the baseband processor 109 releases the resource use restriction when all the BE resource R allocated to the priority call is released.

Accordingly, it is possible to use the total baseband resource $R_{ALL}$ efficiently while securing the BB resource R to be allocated to the priority call.

(5) Other Embodiments

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

For example, in the above-described embodiment of the present invention, the baseband processor 109 releases the resource use restriction when all the BB resource R allocated to the priority call is released. However, the resource use restriction does not necessarily have to be released. For example, the baseband processor 109 may release the resource use restriction when a predetermined time period elapses after all the BB resource R allocated to the priority call is released.

In the above-described embodiment, when the free baseband resource not allocated to the normal call exists in the BB resource R (the residual baseband resource, the baseband processor 109 allocates the free baseband resource to the priority call. However, the baseband processor 109 may be configured to always allocate the priority call-baseband resource $R_P$ to the priority call.

As described above, the present invention naturally includes various embodiments which are not described herein. Accordingly, the technical scope of the present invention should be determined only by the matters to define the invention in the scope of claims regarded as appropriate based on the description.

It is to be noted that the entire contents of Japanese Patent Application No. 2007-318033 (files on Dec. 10, 2007) are incorporated herein by reference.

INDUSTRIAL APPLICABILITY

As described above, the radio base station and the communication control method according to the present invention are capable of reliably allocating the baseband resource which is necessary for the priority call and to which the baseband resource is allocated in preference to the normal call, even when the baseband resource to be allocated to the normal call is changed in an extremely short cycle, and are therefore useful for radio communication such as mobile communication.

The invention claimed is:

1. A radio base station comprising:
   a call process controller configured to accept a normal call to call a communication destination and a priority call to be handled in preference to the normal call; and
   a baseband processor configured to allocate a baseband resource to the normal call or the priority call based on the normal call or the priority call accepted by the call process controller, the baseband resource being a traffic processing capability in a baseband, wherein
   the call process controller updates a status of the baseband resource based on a status of the baseband resource reported from the baseband processor and determines whether or not to accept a call based on the status of the updated baseband resource,
   the call process controller notifies the baseband processor of an offset of the baseband resource when accepting the priority call, and
   the baseband processor changes the baseband resource to be allocated to the normal call in a predetermined cycle, such that the normal call remains active while the baseband processor changes the baseband resource, and applies a resource use restriction based on the offset notified from the call process controller, the resource use restriction restricting the baseband resource to be allocated to the normal call within a range defined by subtracting the offset from a total baseband resource.

2. The radio base station according to claim 1, wherein the baseband processor allocates a priority call-baseband resource whose application to the normal call is not allowed by the resource use restriction, to the priority call.

3. The radio base station according to claim 2, wherein when a free baseband resource unallocated to the normal call exists within a residual baseband resource obtained by subtracting the offset from the total baseband resource, the baseband processor allocates the free baseband resource to the priority call.

4. The radio base station according to claim 1, wherein the baseband processor releases the resource use restriction when all the baseband resource allocated to the priority call is released in conjunction with termination of the priority call.

5. The radio base station according to claim 1, wherein resource use restriction is maintained at a constant value based on the offset while the baseband processor changes the baseband resource to be allocated to the normal call in the predetermined cycle using the remaining available baseband resources.

6. The radio base station according to claim 1, wherein the predetermined cycle is no greater than every two milliseconds.

7. A communication control method comprising the steps of:
   accepting a normal call to call a communication destination and a priority call to be handled in preference to the normal call;
   allocating a baseband resource to any of the normal call and the priority call based on the normal call or the priority call accepted in the step of accepting the normal call and the priority call, the baseband resource being a traffic processing capability in a baseband; and
   changing the baseband resource to be allocated to the normal call in a predetermined cycle, such that the normal call remains active while the baseband resource is changed, the method further comprising the steps of:

updating a status of the baseband resource and determining whether or not to accept a call based on the status of the updated baseband resource;

determining an offset of the baseband resource when the priority call is accepted; and applying a resource use restriction based on the determined offset to restrict the baseband resource to be allocated to the normal call within a range defined by subtracting the offset from a total baseband resource.

* * * * *